J. H. GLAUBER.
FAUCET OR COCK.
APPLICATION FILED NOV. 23, 1910.
1,007,554.
Patented Oct. 31, 1911.
2 SHEETS—SHEET 2.
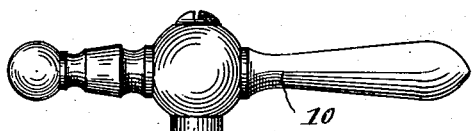
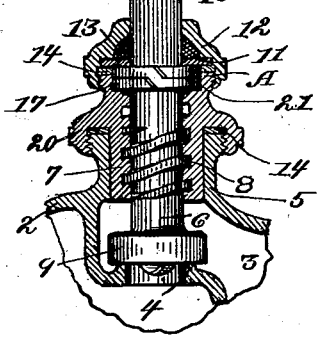
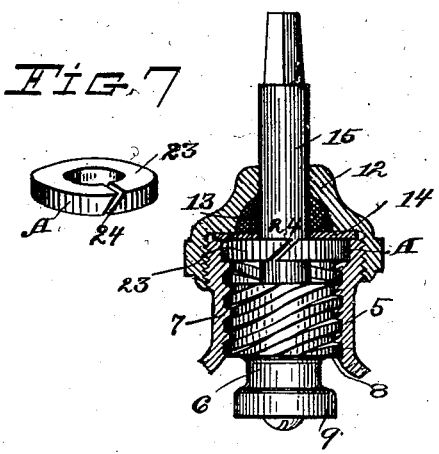
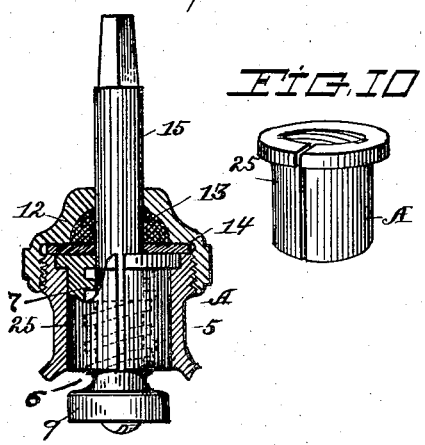
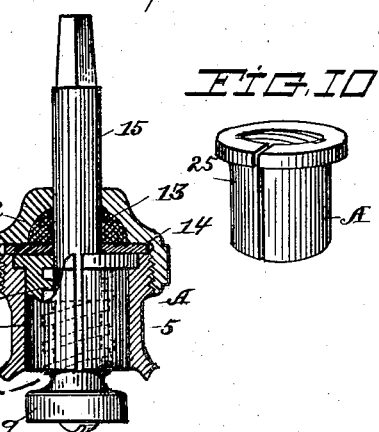
Witnesses
E. M. Fisher
H. H. Knapp
Inventor
Joseph H. Glauber
by Fisher & Moser
Attorney

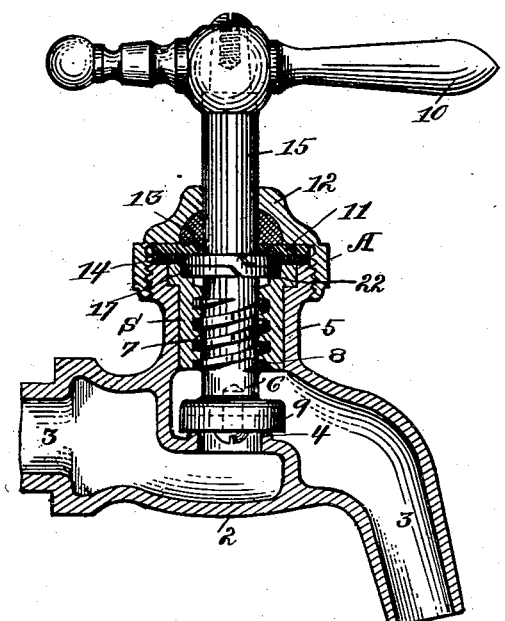

UNITED STATES PATENT OFFICE.

JOSEPH H. GLAUBER, OF CLEVELAND, OHIO.

FAUCET OR COCK.

1,007,554.  Specification of Letters Patent.  Patented Oct. 31, 1911.

Application filed November 23, 1910. Serial No. 593,791.

*To all whom it may concern:*

Be it known that I, JOSEPH H. GLAUBER, a citizen of the United States, residing at Cleveland, in the county of Cuyahoga and State of Ohio, have invented certain new and useful Improvements in Faucets or Cocks, of which the following is a specification.

My invention relates to improvements in faucets or cocks of the quick-opening and closing kind wherein a quarter or half turn of the handle will open the valve to its maximum, and the improvement comprises a gripping device for the stems of such faucets or cocks to prevent accidental displacement of the valve from any set position by the pressure of the water from within or for any other reason, substantially as herein shown and described and more particularly pointed out in the claims.

Faucets or cocks of the quick-opening type are generally provided with valve stems having toggle-blocks, cams, or threads of extreme pitch or of steep incline to open the valve. The threaded form is simple and more generally used as it has decided advantages. But certain disadvantages also exist, the most objectionable of which is self-opening of the valve when the same is exposed to high pressures such as met with in many places, or even when exposed to ordinary pressures, particularly after the parts have become slightly worn. Self-opening is due to the pressure of the water against the bottom of the valve and consequent uplift thereof by rotation of the stem on account of the extreme pitch of the threads,—less resistance being offered by steep inclines than those of ordinary form as is obvious. Thus a valve may be closed and then without warning it may gradually or suddenly open, particularly if installed in a high pressure system or in one wherein the pressure varies, or pulsates. As an illustration, in some cities, the water pressure is considerably increased on short notice for fire-department services, an abnormal condition which valves of this kind are not always able to withstand. Self-opening may not occur in some cases when the faucet or cock is first installed and all the parts are new and the packing in good shape, but will happen after a short period of use and with perhaps disastrous results because unexpected. Again, under these conditions permanent setting of the valve at any desired position to regulate the amount of flow is also uncertain or even impossible. In other words, a partial open position of the valve cannot always be maintained to give a constant flow of a small amount of water as the valve will not remain set.

Now my object is to provide a simple and inexpensive device for the faucet or cock which will overcome the objections noted and materially improve the faucet or cock and add to its life and utility, all without complication and necessary change in external appearance of the faucet or cock.

In the accompanying drawings, Figure 1 is an elevation and sectional view of a faucet or cock embodying my improvement in its preferred form, and Fig. 2 is a cross section at right angles to said figure with the valve in full-open position. Fig. 3 is a sectional view of a modified form of faucet and gripping device, and Fig. 4 is an elevation and sectional view of a further modification thereof. Fig. 5 is a sectional view of a friction spring before it is expanded, the dotted lines representing a valve stem to clearly show the difference in diameters of the two parts when the spring is of normal size. Fig. 6 is a sectional view of a portion of a faucet having a screw bonnet containing a friction spring as shown therein. Fig. 7 is a perspective view of a spring washer adapted to co-act with a valve stem for the purposes herein specified, and Fig. 8 is a sectional view of a portion of a faucet or cock showing a valve stem and said spring washer in working relations. Fig. 9 is a further modification showing a valve stem seated in a rotatable screw-seat which is split and expanded over the stem to frictionally lock upon the same, and Fig. 10 is a perspective view of said screw-seat alone.

The foregoing figures represent in many respects a common type of faucet or cock embodying a quick-opening and closing valve operatively controlled by a screw stem. My improvement is not necessarily limited to this type of faucet or cock, but as shown, the more common features of construction comprise a body 2 having a main water passage 3 provided with a valve seat 4 arranged in line with tubular extension 5 of body 2. Extension 5 is generally provided with internal threads 7 (see Figs. 3, 4 and 8) which are engaged by corresponding threads 8 on screw-stem 6. These threads are of more or less extreme pitch to give a relatively quick full-opening and closing movement to valve 9 by a short turn of handle 10, and they may be of either double, triple, or quadruple form. Handle 10 is limited to a quarter or half of a turn in opening the valve by limiting the upward play of the screw portion 8 as usual—the customary metallic washer 11 within the top of extension 5 serving as a stop when locked in place by cap nut 12. A packing gland 13 and sealing washer 14 are also usually provided within cap nut 12 to seal the faucet about stem 6 and the top of extension 5, and this cap nut may be variously constructed as indicated in the drawings. In my preferred construction (see Figs. 1 and 2) cap nut 12 also serves other purposes, one of which is to lock the separate removable and rotatable screw-seat S in fixed position within extension 5 as shown and described in my copending application, filed on the 12th day of November, 1910, Ser. No. 592,043. In this construction, screw threads 7 are formed in separate part S, and valve 9 serves as a stop to limit the degree of rotation of stem 6 and its movement upwardly, while washer 11 acts as a backing and confining member for a gripping member A which is the essential embodiment of my present improvement. This improvement consists primarily of a gripping device A for the valve stem combined with the other elements named herein, which device is in the form of a spring or spring clamp, several modifications being shown in the respective figures. These modifications will be separately and specifically described later but all have the same function and produce substantially similar results. Thus, gripping device A in Figs. 1 to 6 inclusive comprises a closed spring—one having its coils seated in close contact to prevent expansion under compression, and its inside diameter is preferably less than the diameter of the straight shank 15 of valve stem 6. Spring 16 in Figs. 4 and 5 may perhaps illustrate my idea best as this spring is made with a greater number of coils than spring 17 shown in Figs. 1, 3 and 6. In assembling the parts, either form of spring is forced over shank 15 and expanded more or less, thereby causing a tight gripping fit thereafter even though wear takes place as obviously must occur in time. By expansion I do not mean that the coils of the spring are separated but that the diameter of the spring is increased while the coils remain in contact so that when wear takes place a natural self-contraction will follow to maintain gripping results substantially as before. Now having a constant grip of this kind upon valve stem 6 it will be seen that the tendency of the spring is to rotate and also move endwise with the stem when it is rotated. This is prevented in Fig. 1, by washer 11 and cap nut 12 when screwed and fastened tightly upon extension 5, and therefore when the valve stem is turned in either direction the stem must perforce rotate and move axially through the spring, as the latter is prevented from any end movement whatsoever. The degree of friction or grip is not particularly noticeable at the handle during operations but is amply sufficient to supplement the normal friction between the threads and other engaging parts so that the valve stem will positively remain in any set position regardless of internal pressures and particularly such as have hitherto been deemed excessive for this type of faucet or cock. Prolonged use will not affect the results either as this condition has also been anticipated by the natural self take-up of the spring as wear occurs. Changes in temperature and expansion and contraction resulting therefrom are also thus provided for.

In Figs. 1, 3 and 6 coiled spring 17 differs slightly in form from that of spring 16 as it is made of flat-faced or square stock instead of round. A flat-faced spring gives the maximum contact surface for frictional purposes and permits a minimum number of coils to be used, and this spring is also expanded to have a forced fit with valve stem 6.

In Fig. 3 spring 17 is seated in an annular recess 18 at the top of nut 12 and is locked in place against axial movement by screw cap 19.

In Fig. 4, spring 16 is seated above washers 11 and 14 and occupies the hollow interior of nut 12.

In Fig. 6 a bonnet 20 serves as a screw-seat for valve stem 6, and this bonnet is screwed or otherwise fastened to extension 5 of the faucet or cock. Cap nut 12 confines spring 17 in an annular recess 21 in the top of the bonnet and prevents end movement thereof when the valve stem is rotated. No independent rotation of bonnet 20 is obtainable without end movement thereof on account of its screw connection with extension 5, but in Fig. 1 screw-seat S is separate from cap nut 12 and may be independently removed or rotated when not locked in place by the cap nut. Spring 17 is also seated in an annular recess 22 in the top of this screw-seat S and is jointly locked in place with said screw-seat by cap nut 12 through the medium of washer 11. Sealing washer 14 is beneath metal washer 11 and has an opening centrally to permit spring 17 to pass therethrough into seating engagement with the bottom of the metal washer. Axial movement of spring 17 is undesirable and a metal or hard seat at both ends thereof is preferred instead of one subject to yield or wear. Fig. 1 provides a very compact and efficient construction possessing advantages and functions only obtainable by combining my present improvement with my other improvement described in my other application hereinbefore identified.

In Figs. 7 and 8, a washer 23 having a split 24 therein is substituted for washer 11, and being of spring metal the same may be expanded to have a like gripping effect as friction spring 17 although possibly not as efficient in service and life as said spring.

In Figs. 9 and 10, a thimble or sleeve 25 is used to take the place of spring 17 and also washer 11 and this thimble is threaded internally to seat the threads of valve stem 6 and is also split longitudinally to permit a certain measure of expansion therein so that it may have a force fit and spring-like grip upon the threaded part of the stem and serve to always clamp the stem in any set position in a manner similar to friction spring 17. Thimble 25 is clamped tightly within extension 5 by cap nut 12 and sealing washer 14, and is not independently rotatable except as circumstances may require.

Other forms of gripping or tension devices may be used but the foregoing are believed to be sufficient to illustrate the scope of my invention, and the claims herein are to be construed accordingly.

What I claim is:

1. In a faucet or cock of the quick-opening and closing type, a valve stem and a self-adjusting gripping device having constant tightening engagement with the stem to hold the same in any set position.

2. A faucet or cock having a rotatable-lift valve stem and a self-contracting friction device constantly contracted upon said stem and mounted in fixed position upon said faucet or cock for the purposes specified.

3. A faucet or cock having a valve stem provided with a quick thread, a spring member having constant contractible clamping engagement with said stem, and means to secure said spring member in fixed position upon said faucet or cock.

4. A faucet or cock having a rotatable valve stem provided with a quick operating thread, a self-adjustable member encircling said stem and fitting tightly thereon, and a cap nut to confine said member in place within said faucet or cock.

5. A faucet or cock having a quick-acting valve stem, a spring having closed coils expanded over said stem in tight frictional engagement therewith, and a cap nut and washer for said faucet or cock to fix said spring against end movement.

6. A faucet or cock having a valve, a screw-stem for said valve, and a separate removable and rotatable screw-seat for said screw stem, in combination with a self-take-up friction device contracted upon said stem, and means to lock said screw-seat and friction device jointly in fixed position upon said faucet or cock.

7. A faucet or cock having a valve provided with a screw-stem, and a separate removable and rotatable screw-seat for said stem having an annular recess in its top, in combination with a self-tightening friction device for said stem seated in said recess, and means to secure said screw-seat within said faucet or cock and prevent end movement of said device with said stem.

In testimony whereof I affix my signature in the presence of two witnesses.

JOSEPH H. GLAUBER.

Witnesses:
W. B. NESBITT,
T. C. DOOLITTLE.